US012798118B2

(12) United States Patent
Hu et al.

(10) Patent No.: US 12,798,118 B2
(45) Date of Patent: Nov. 17, 2026

(54) CONVEYING MANIPULATOR FOR MACHINING PRECISION PARTS

(71) Applicants: QINGDAO UNIVERSITY OF TECHNOLOGY, Linyi (CN); Linyi Jisheng Intelligent Equipment Co., Ltd., Linyi (CN)

(72) Inventors: Yaozeng Hu, Linyi (CN); Tao Zhou, Linyi (CN); Fazhan Yang, Linyi (CN); Yakui Liu, Linyi (CN); Long Wang, Linyi (CN); Shoudong Zhang, Linyi (CN); Jitao Lv, Linyi (CN); Guangyi Li, Linyi (CN); Jishuai Zhou, Linyi (CN)

(73) Assignees: QINGDAO UNIVERSITY OF TECHNOLOGY, Linyi (CN); Linyi Jisheng Intelligent Equipment Co., Ltd., Linyi (CN)

( * ) Notice: Subject to any disclaimer, the term of this patent is extended or adjusted under 35 U.S.C. 154(b) by 814 days.

(21) Appl. No.: 18/325,237

(22) Filed: May 30, 2023

(65) Prior Publication Data

US 2023/0302662 A1 Sep. 28, 2023

Related U.S. Application Data

(63) Continuation of application No. PCT/CN2021/143776, filed on Dec. 31, 2021.

(30) Foreign Application Priority Data

Jun. 30, 2021 (CN) ........................ 202110741728.X

(51) Int. Cl.

| | |
|---|---|
| ***B65G 15/14*** | (2006.01) |
| ***B25J 9/16*** | (2006.01) |
| ***B25J 15/02*** | (2006.01) |

(52) U.S. Cl.
CPC ......... *B25J 15/0286* (2013.01); *B25J 9/1687* (2013.01); *B65G 15/14* (2013.01)

(58) Field of Classification Search
CPC ...... B25J 15/0286; B25J 9/1687; B65G 15/14
See application file for complete search history.

(56) References Cited

U.S. PATENT DOCUMENTS

2002/0070097 A1* 6/2002 Ritter ..................... B65G 15/14 198/728

FOREIGN PATENT DOCUMENTS

| | | |
|---|---|---|
| CN | 207312415 U | 5/2018 |
| CN | 207417703 U | 5/2018 |

(Continued)

OTHER PUBLICATIONS

CN_211495576_U_translate (Year: 2020).*
CN_213201597_U_translate (Year: 2020).*
CN_213264126_U_translate (Year: 2020).*

*Primary Examiner* — Robert W Hodge
*Assistant Examiner* — Rehman A Qureshi
(74) *Attorney, Agent, or Firm* — Ricky Lam

(57) ABSTRACT

Provided is a conveying manipulator for machining precision parts in the technical field of conveying manipulators, including two machining tables with tabletops on a same horizontal plane and used for placing parts to be machined, a mechanical arm assembly for conveying the parts, and a mounting bracket for mounting the mechanical arm assembly; the mechanical arm assembly includes a mechanical arm a for conveying the parts and a mechanical arm b for assisting the mechanical arm a to jointly convey the parts, where the mechanical arm a includes a conveyor belt and an arm frame assembly, and the mechanical arm a and the mechanical arm b are symmetrically arranged.

6 Claims, 15 Drawing Sheets

(56) References Cited

FOREIGN PATENT DOCUMENTS

| | | | | |
|---|---|---|---|---|
| CN | 108750535 | A | | 11/2018 |
| CN | 109760874 | A | | 5/2019 |
| CN | 110697319 | A | | 1/2020 |
| CN | 111099273 | A | | 5/2020 |
| CN | 111361927 | A | | 7/2020 |
| CN | 211494709 | U | | 9/2020 |
| CN | 211495576 | U | * | 9/2020 |
| CN | 211619570 | U | | 10/2020 |
| CN | 211768298 | U | | 10/2020 |
| CN | 213169887 | U | | 5/2021 |
| CN | 213201597 | A | | 5/2021 |
| CN | 213201597 | U | * | 5/2021 |
| CN | 213264126 | U | * | 5/2021 |
| CN | 213349781 | U | | 6/2021 |
| CN | 113401568 | A | | 9/2021 |

* cited by examiner

CONVEYING MANIPULATOR FOR MACHINING PRECISION PARTS

CROSS-REFERENCE TO RELATED APPLICATIONS

This disclosure is a continuation of PCT/CN2021/143776, filed on Dec. 31, 2021, and claims priority to Chinese Patent Application No. 202110741728.X, filed on Jun. 30, 2021, the contents of which are hereby incorporated by reference.

TECHNICAL FIELD

The disclosure relates to the technical field of handling manipulators, and in particular to a conveying manipulator for machining precision parts.

BACKGROUND

With a development of automation technology, there are more and more kinds of manipulators, and different manipulators have different specific structures according to application scenarios.

For example, there are a conveying manipulator for machining precision parts disclosed in a Chinese patent with a publication number of CN209682168U and a precision positioning conveying manipulator for machining precision parts disclosed in a Chinese patent with a publication number of CN206029864U.

Although the above two kinds of manipulators have different structures, the manipulators also have same conveying characteristics. The above two kinds of manipulators change spatial positions of conveyed objects by changing X-axes, Y-axes and Z-axes of the manipulators during conveying processes.

In this way, if there is no obstacle between conveying starting points of the conveyed objects, the starting points are on a same horizontal plane and the manipulators are used, and the X-axes and the Y-axes of the manipulators are still needed to be changed to change the spatial positions of the conveyed objects, so the conveyed objects may not be conveyed linearly.

Based on this, the disclosure designs a conveying manipulator for machining precision parts to solve the above problem.

SUMMARY

An objective of the disclosure is to provide a conveying manipulator for machining precision parts, so as to solve a problem that if there is no obstacle between conveying starting points of conveyed objects, the starting points are on a same horizontal plane and manipulators proposed in a background art are used, X-axes and Y-axes of the manipulators are still needed to be changed to change spatial positions of the conveyed objects, so the conveyed objects may not be conveyed linearly.

In order to achieve the above objective, the disclosure provides a following technical scheme: a conveying manipulator for machining precision parts, including two machining tables with tabletops on a same horizontal plane for placing parts to be machined, a mechanical arm assembly for conveying the parts, and a mounting bracket for mounting the mechanical arm assembly, where the mechanical arm assembly includes a mechanical arm a for conveying the parts and a mechanical arm b for assisting the mechanical arm a to jointly convey the parts, and the mechanical arm a includes a conveyor belt and an arm frame assembly.

The conveyor belt is used for clamping and conveying the parts, and the arm frame assembly includes an upper arm frame and a lower arm frame for mounting, limit rollers for limiting position of the conveyor belt, driving rollers for driving the conveyor belt, and a driving assembly for driving the driving rollers.

The mechanical arm b has same structures as structures of the mechanical arm a except for an absence of same assembly as the driving assembly in the structures of the mechanical arm b. The mechanical arm a and the mechanical arm b are symmetrically arranged in a clamping cavity of two vertical plates in a width direction of the mechanical arm a.

Optionally, the mounting bracket includes a horizontally placed square plate; a bottom surface of the square plate is fixedly provided with electrically driven track wheels, where bottoms of the track wheels are provided with guide rails; a top surface of the square plate is fixedly provided with the two vertical plates symmetrically arranged in the width direction of the mechanical arm a, where a sliding rod and a bidirectional screw rod parallel to a length direction of the mechanical arm a are installed between the two vertical plates; and a motor a for driving the bidirectional screw rod is also fixedly installed on the top surface of the square plate.

Optionally, both ends of each of the sliding rod and the bidirectional screw rod are respectively installed on plate bodies of the two vertical plates through bearing seats, and a rear end of an output end of the motor a is connected with an end of the bidirectional screw rod through a coupling close to the motor through a coupling.

Optionally, ends of the conveyor belt are connected to form a closed loop, and a belt surface of the conveyor belt is perpendicular to the top surface of the square plate, and side walls of a cavity of the closed loop in a middle section of the conveyor belt are provided with reinforcing ribs a, and side walls of a cavity of the closed loop at an upper end and a lower end of the conveyor belt are provided with reinforcing ribs b.

Optionally, the upper arm frame is a strip plate; a side of the upper arm frame is uniformly provided with limit roller mounting holes a penetrating upper and lower surfaces of the upper arm frame, and an end of the upper arm frame is provided with gear carrier mounting holes a and a motor shaft mounting hole, ends of the upper arm frame are provided with driving roller mounting holes a, the gear carrier mounting holes a, the motor shaft mounting hole, and the driving roller mounting holes a are all penetrating the upper and lower surfaces of the upper arm frame, and a bottom wall of one of the ends of the upper arm frame is also provided with mounting posts a.

Optionally, the lower arm frame is a strip plate; a side of the lower arm frame is uniformly provided with limit roller mounting holes b penetrating upper and lower surfaces of the lower arm frame, an end of the lower arm frame is provided with gear carrier mounting holes b, ends of the lower arm frame are provided with driving roller mounting holes b, the gear carrier mounting holes b and the driving roller mounting holes b are penetrating the upper and lower surfaces of the lower arm frame, a bottom wall of one of the ends of the lower arm frame is also provided with mounting posts b, a plate body of the lower arm frame is also provided with a reserved hole for threading electric wires, and a bottom wall of a middle section of the lower arm frame is provided with a slider a and a slider b arranged symmetrically; the slider a is provided with a threaded hole penetrating two side walls of the slider a in the width direction of the mechanical arm a, where the threaded hole is screwed with the bidirectional screw rod; and the slider b is provided with a through hole penetrating two side walls of the slider b in the width direction of the mechanical arm a, where the through hole is sliding sleeved on a rod body of the sliding rod.

Optionally, each of the limit rollers includes a cylindrical roller shaft a, and two roller bodies a symmetrically arranged up and down are fixedly arranged on a shaft body of the roller shaft a, and the roller bodies a and the roller shaft a are coaxially arranged; a top end of the roller shaft a is inserted into a cavity of one of the limit roller mounting holes a, and a bottom end of the roller shaft a is inserted into a cavity of one of the limit roller mounting holes b.

Optionally, each of the driving rollers includes a cylindrical roller shaft b, where a top end of the roller shaft b is arranged in a cavity of one of the driving roller mounting holes a, and a bottom end of the roller shaft b is arranged in a cavity of one of the driving roller mounting holes b; a gear a is fixedly installed in a middle section of a shaft body of the roller shaft b, two roller bodies b symmetrically arranged up and down are also fixedly installed on a shaft body of the gear a, and the gear a is sandwiched between the two roller bodies b, and the roller shaft b, the gear a and the roller bodies b are coaxially arranged.

Optionally, the driving assembly include a gear carrier a, a gear carrier b, a gear carrier c, a mounting pad and a motor b.

The gear carrier a includes a cylindrical first rod body and a first gear fixedly installed in a middle section of the first rod body, where the first rod body of the gear carrier a and the first gear are coaxially arranged, and the first gear is meshed with the gear a; and a top end of the first rod body of the gear carrier a is arranged in a cavity of one of the gear carrier mounting holes a, and a bottom end of the first rod body in the gear carrier a is arranged in a cavity of one of the gear carrier mounting holes b.

The gear carrier b includes a second cylindrical rod body and a second middle gear and a second upper gear fixedly installed at a middle section and an upper section of the second rod body respectively, where the second rod body of the gear carrier b and the second middle gear and the second upper gear are coaxially arranged, and the second middle gear installed at the middle section of the second rod body in the gear carrier b is meshed with the gear in the gear carrier a; and a top end of the second rod body in the gear carrier b is arranged in a cavity of one of the gear carrier mounting holes a, and a bottom end of the rod body in the gear carrier b is arranged in a cavity of one of the gear carrier mounting holes b.

The gear carrier c includes a cylindrical third rod body and a third gear fixedly installed in a middle section of the third rod body, where the third rod body and the third gear in the gear carrier c are coaxially arranged, the third gear in the gear carrier c is meshed with the second upper gear installed on the upper section of the second rod body in the gear carrier b, and a top end of the third rod body in the gear carrier c is arranged in a cavity of one of the gear carrier mounting holes a.

The mounting pad is an oval plate body arranged horizontally, where a middle section of the mounting pad is provided with a shaft hole for mounting the gear carrier c, and a bottom end of the third rod body in the gear carrier c is arranged in the shaft hole, and both ends of the mounting pad are provided with first mounting holes for fixing the mounting pad, and each of the first mounting holes is aligned with corresponding one of the mounting posts a respectively.

The motor b includes a motor for driving and a gear fixedly installed at an end of a rotor of the motor, where the rotor in the motor b and the gear installed at the end of the rotor end in the motor b are coaxially arranged, and the gear is meshed with the third gear in the gear carrier c; and a top end of the end of the rotor in the motor b is arranged in a cavity of the motor shaft mounting hole, and a bottom of the motor b is provided with second mounting holes for fixing the motor b, where each of the first mounting holes is aligned with corresponding one of the mounting posts a respectively.

Compared with the prior art, the embodiment has advantages that the mechanical arm a and the mechanical arm b are symmetrically arranged, and the mechanical arm a and the mechanical arm b may be driven to be close to each other by the motor, so as to clamp objects, and the clamped objects may be conveyed linearly under a cooperative operation of the mechanical arm a and the mechanical arm b, thus overcoming a defect mentioned in the background art that the conveyed objects may not be conveyed linearly.

Of course, there is no need for any product implementing the disclosure to achieve all the advantages mentioned above at the same time.

BRIEF DESCRIPTION OF THE DRAWINGS

In order to explain technical schemes of embodiments of the disclosure more clearly, drawings needed for an embodiment description may be briefly introduced below. Obviously, the drawings in the following description are only some embodiments of the disclosure. For ordinary people in the field, other drawings may be obtained according to these drawings without a creative work.

DETAILED DESCRIPTION OF THE EMBODIMENTS

In the following, technical schemes in embodiments of the disclosure may be clearly and completely described with reference to attached drawings. Obviously, the described embodiments are only a part of the embodiments of the disclosure, but not all embodiments. Based on the embodiments in the disclosure, all other embodiments obtained by ordinary technicians in the field without a creative work belong to a protection scope of the disclosure.

Figure 1:
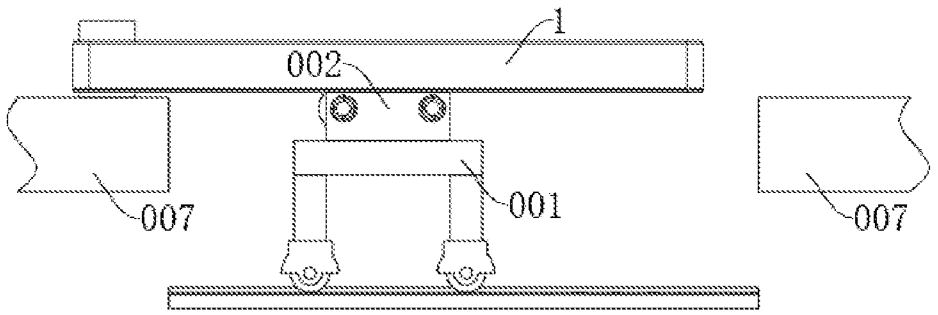
FIG. 1 is a schematic diagram according to the disclosure.
Figure 2:
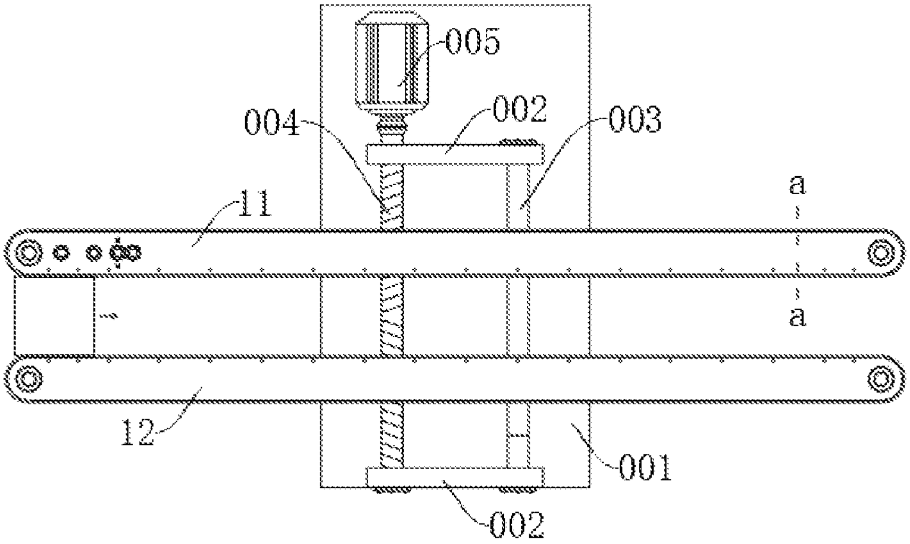
FIG. 2 is a schematic top plan view according to the disclosure.

With reference to FIG. 1 and FIG. 2, the disclosure provides a technical scheme for conveying precision parts linearly, and in particular to a conveying manipulator for machining precision parts, the conveying manipulator includes the following structures.

Two machining tables 007 for placing parts to be machined, where tabletops of the two machining tables 007 are on a same horizontal plane, and there is no obstacle in a space between the two machining tables 007, so as to avoid hindering equipment according to the disclosure from conveying.

A mechanical arm assembly 1 for conveying parts, including a mechanical arm all and a mechanical arm b12, where the mechanical arm all and the mechanical arm b12 clamp a part to be conveyed from both sides, and change a position of the part through mechanical movements of the mechanical arm all and the mechanical arm b12 themselves.

A mounting bracket for mounting the mechanical arm assembly 1 and used for controlling the mechanical arm all and the mechanical arm b12 to perform clamping or releasing actions. Additionally, the mounting bracket may also drive the mechanical arm assembly 1 to perform a directional linear displacement.

Further, the mounting bracket for mounting the mechanical arm assembly 1 includes a square plate 001, two vertical plates 002, a sliding rod 003, a bidirectional screw rod 004, a motor a005, four track wheels and two guide rails.

The square plate 001 is placed horizontally, is kept horizontal with a ground, and is used as a trunk of the mounting bracket to connect other parts of the mounting bracket.

The two vertical plates 002 are symmetrically arranged in a width direction of the mechanical arm all, and are fixedly installed on a top surface of the square plate 001, and a front wall, a rear wall, a left wall and a right wall of each of the vertical plates 002 are all perpendicular to the top surface of the square plate 001; a plate body of each of the vertical plates 002 is provided with mounting holes penetrating through the front wall and the rear wall of each of the vertical plates 002, and bearing seats are fixedly installed in the mounting holes, and the sliding rod 003 and the bidirectional screw rod 004 are installed on the two vertical plates 002 through the bearing seats.

Both ends of each of the sliding rod 003 and the bidirectional screw rod 004 are respectively installed on the two vertical plates 002 through the bearing seats, and the sliding rod 003 and the bidirectional screw rod 004 are arranged parallel to a length direction of the mechanical arm all. An end of the bidirectional screw rod 004 close to the motor passes through a shaft cavity of a bearing seat installed on one of the vertical plates 002 where the rear end is located, and is placed behind this one of the vertical plates 002. The sliding rod 003 and the bidirectional screw rod 004 jointly support the mechanical arm assembly 1.

The motor a005 is fixedly installed on the top surface of the square plate 001 and placed behind the bidirectional screw rod 004. An output end of the motor a005 (an external end of a rotor of the motor a005) is connected with the end of the bidirectional screw rod 004 close to the motor through a coupling, and a forward and reverse rotation of bidirectional screw rod 004 is controlled through a forward and reverse rotation of the motor a005.

The four track wheels are fixedly installed on a bottom surface of the square plate 001 in a rectangular array, where the track wheels are track wheels with electric drive devices in the market. Both guide rails are straight rails, and are laid on the ground in a front-back parallel manner. The four track wheels are grouped in pairs and divided into two groups, and the two groups of track wheels are respectively arranged on the two guide rails, and the track wheels are driven by the electric drive devices to run along the guide rails.

Figure 3:
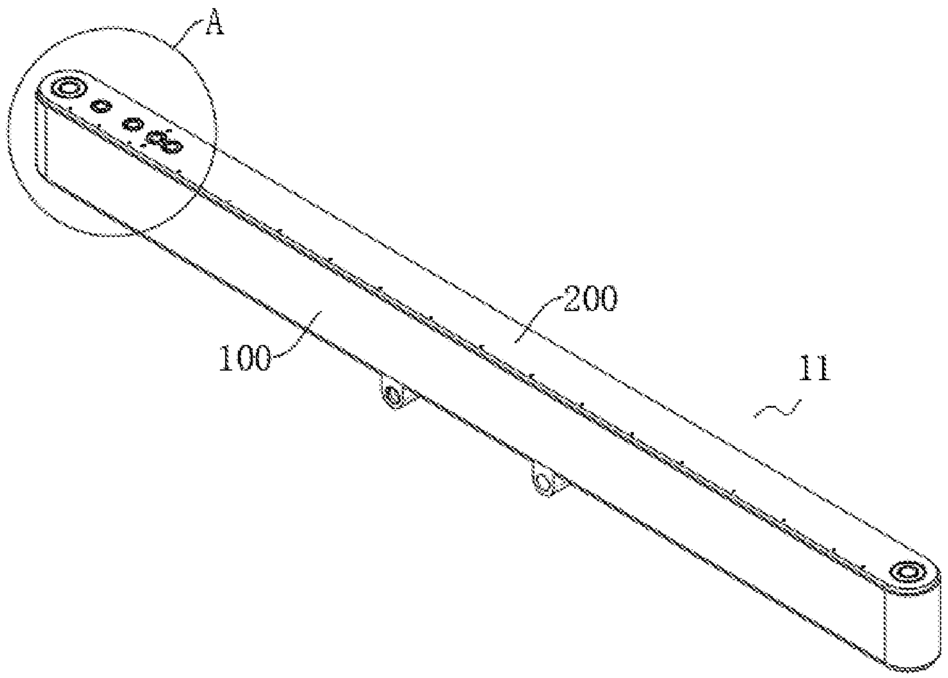
FIG. 3 is a schematic structural diagram of a mechanical arm a according to the disclosure.
Figure 4:
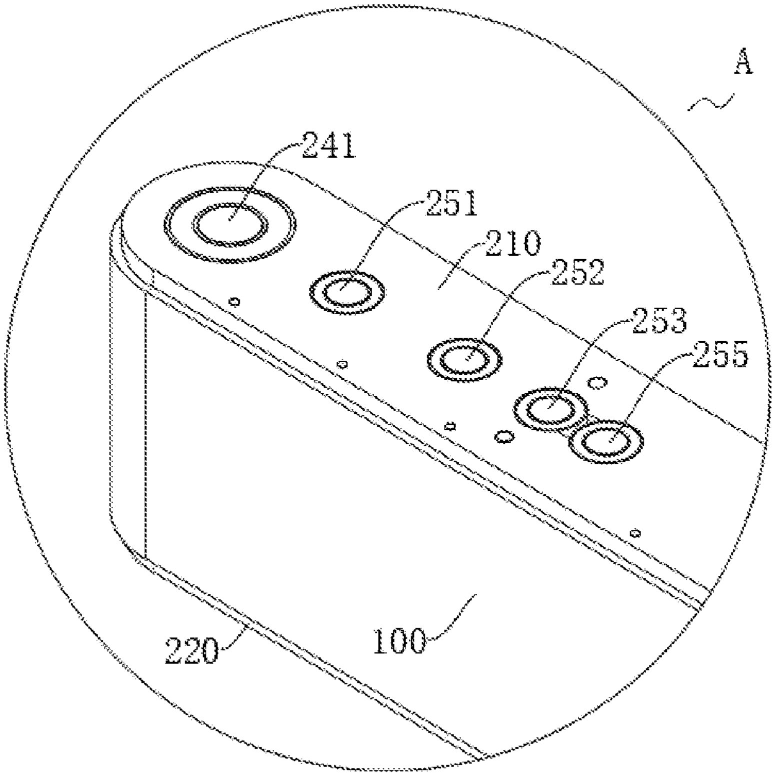
FIG. 4 is an enlarged view at A of FIG. 3 according to the disclosure.
Figure 5:
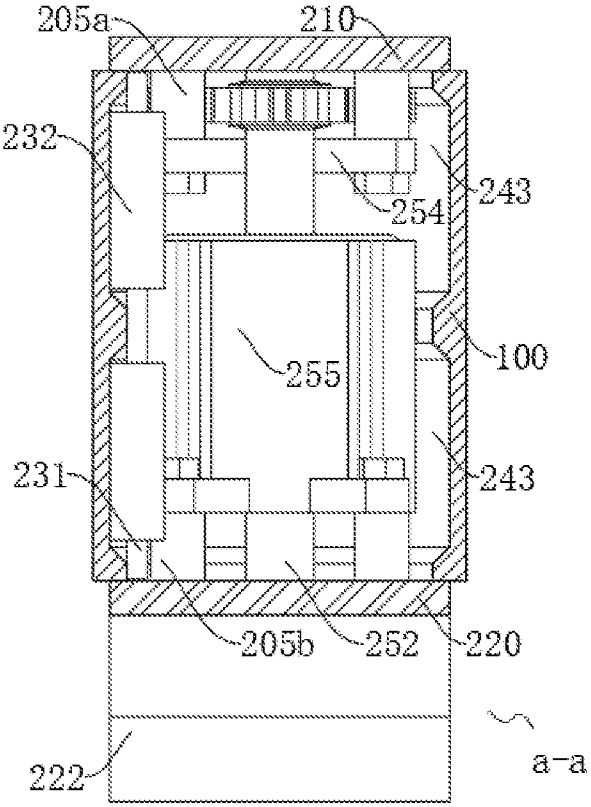
FIG. 5 is a sectional view taken at a-a of FIG. 2 according to the disclosure.

With Reference to FIG. 3, FIG. 4 and FIG. 5, the mechanical arm all provided by the disclosure includes a conveyor belt 100 for clamping and transferring parts and an arm frame assembly 200 for installing and driving the conveyor belt 100.

Figure 6:
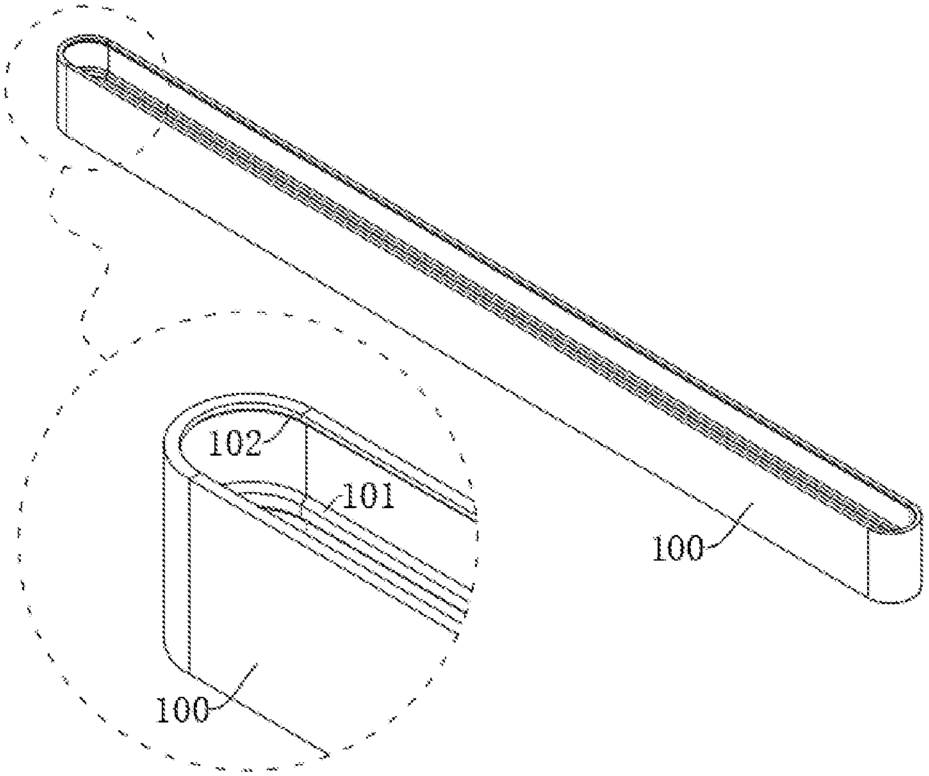
FIG. 6 is a schematic structural diagram of a conveyor belt according to the disclosure.
Figure 7:
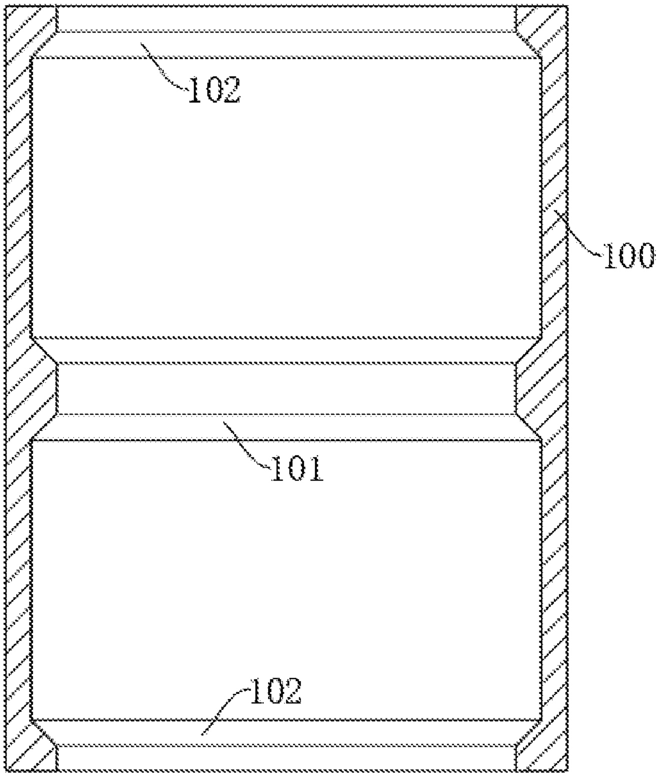
FIG. 7 is a sectional view of a conveyor belt at a-a in FIG. 2.

With Reference to FIG. 6 and FIG. 7, in the conveyor belt 100 provided by the disclosure, ends of the conveyor belt 100 is connected to form a closed loop, and a belt surface of the conveyor belt 100 is perpendicular to the top surface of the square plate 001. Side walls of a cavity of the closed loop in a middle section of the conveyor belt 100 are provided with reinforcing ribs a101, and side walls of the cavity of the closed loop at an upper end and a lower end of the conveyor belt 100 are provided with reinforcing ribs b102. The reinforcing ribs a101 and the reinforcing ribs b102 are both components of the conveyor belt 100. The conveyor belt 100 may be made of elastic materials such as PVC and PU instead of hard materials such as metal, so as not to damage the parts clamped and conveyed by the conveyor belt 100.

Figure 8:
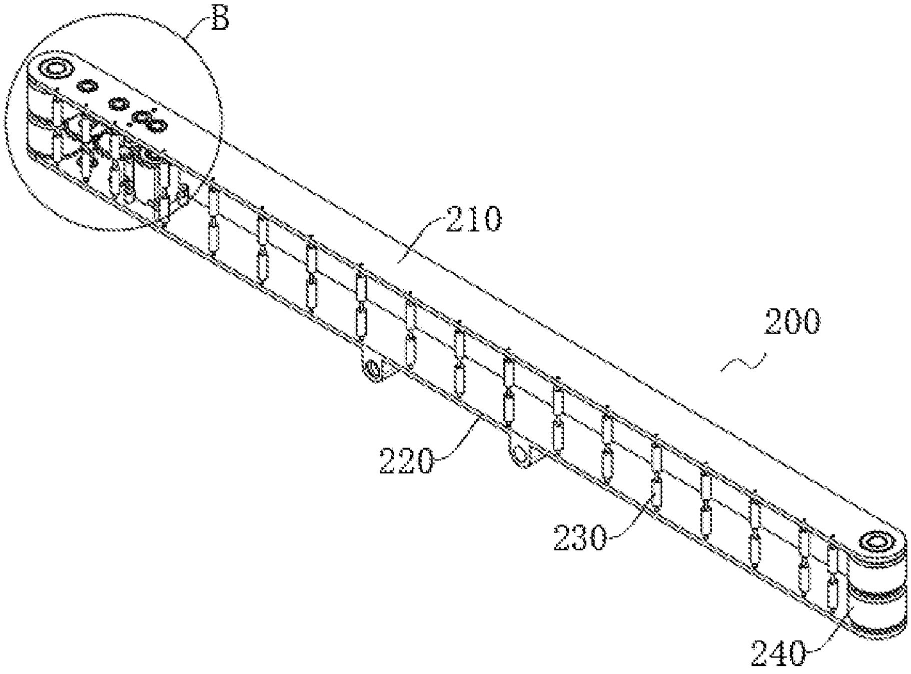
FIG. 8 is a schematic structural diagram of an arm frame assembly according to the disclosure.
Figure 9:
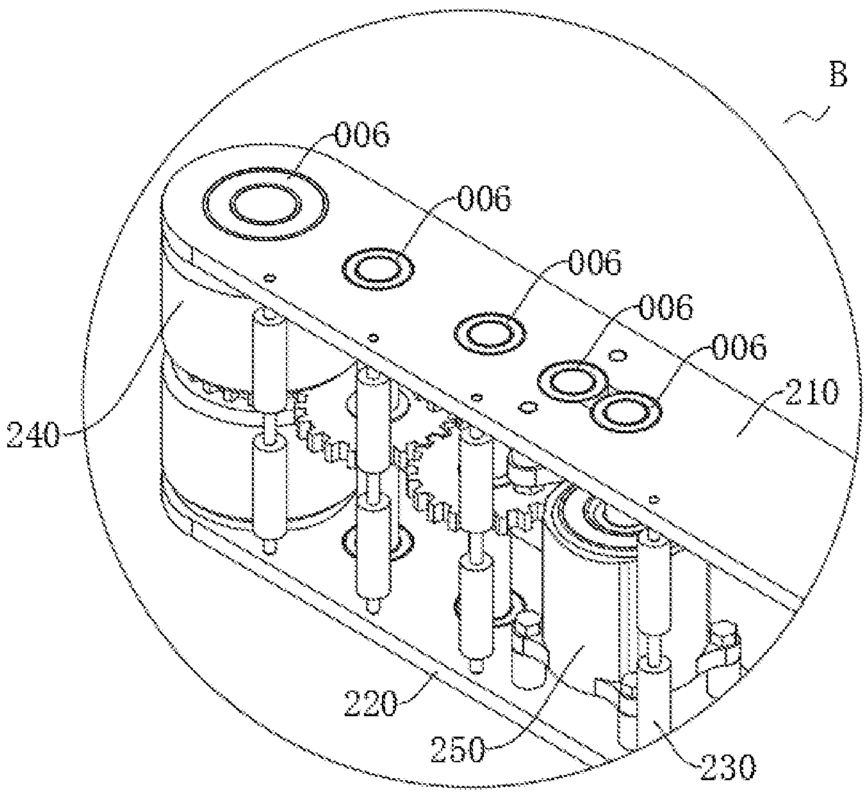
FIG. 9 is an enlarged view at B of FIG. 8 according to the disclosure.

With Reference to FIG. 8 and FIG. 9, the arm frame assembly 200 provided by the disclosure include an upper arm frame 210, a lower arm frame 220, a plurality of limit rollers 230, two driving rollers 240 and a driving assembly 250.

Figure 10:
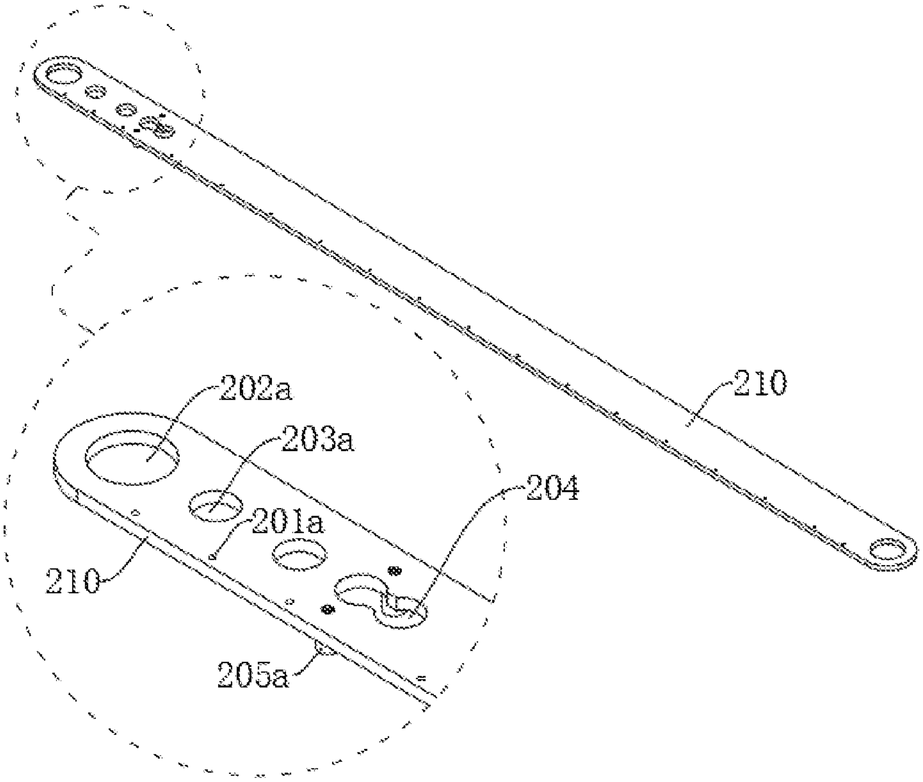
FIG. 10 is a schematic structural diagram of an upper arm frame according to the disclosure.
Figure 11:
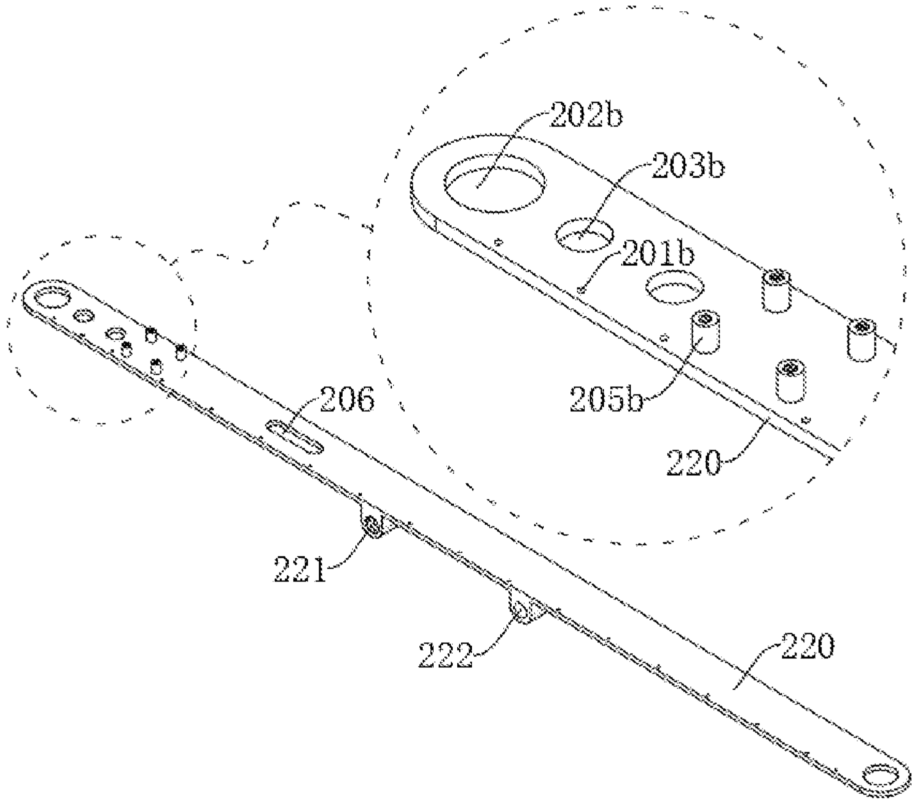
FIG. 11 is a schematic structural diagram of a lower arm frame according to the disclosure.

With Reference to FIG. 10 and FIG. 11, the upper arm frame 210 and the lower arm frame 220 provided by the disclosure are both rectangular strip plates, and the upper arm frame 210 and the lower arm frame 220 are arranged in a vertical parallel manner for limiting other parts of the arm frame assembly 200.

Further, one plate body on one side of the upper arm frame 210 is uniformly provided with limit roller mounting holes a201*a* penetrating upper and lower surfaces of the upper arm frame 210, and one plate body on one side of the lower arm frame 220 is uniformly provided with limit roller mounting holes b201*b* penetrating upper and lower surfaces of the lower arm frame 220. The limit roller mounting holes a201*a* and the limit roller mounting holes b201*b* are located on the same side of the upper arm frame 210 and the lower arm frame 220, and are aligned with each other for limiting the limit rollers 230.

Further, a left end and a right end of the upper arm frame 210 are respectively provided with a driving roller mounting hole a202*a* penetrating the upper and lower surfaces of the upper arm frame 210, and a left end and a right end of the lower arm frame 220 are respectively provided with a driving roller mounting hole b202*b* penetrating the upper and lower surfaces of the upper arm frame 220. The driving roller mounting holes a202*a* and the driving roller mounting holes b202*b* are aligned with each other for limiting the driving rollers 240.

Further, the left end of the upper arm frame 210 is provided with three gear carrier mounting holes a203*a* arranged in a straight line and penetrating the upper and lower surfaces of the upper arm frame 210, and the three gear carrier mounting holes a203*a* are all located to right of a driving roller mounting hole a202*a* provided at the left end of the upper arm frame 210.

Further, a motor shaft mounting hole 204 penetrating the upper and lower surfaces of the upper arm frame 210 is arranged on a right side of a rightmost gear carrier mounting hole a203*a* among the three gear carrier mounting holes a203*a*, and the motor shaft mounting hole 204 communicates with the rightmost gear carrier mounting hole a203*a*.

Further, a cylindrical mounting post a205*a* is respectively arranged at a front side and a rear side of the rightmost gear carrier mounting hole a203*a* among the three gear carrier mounting holes a203*a*, and a top surface of the mounting post a205*a* is fixedly connected with a bottom surface of the upper arm frame 210. A front side and a rear side of the rightmost gear carrier mounting hole a203*a* are respectively provided with a threaded hole penetrating a top surface of the upper arm frame 210, and the threaded hole also penetrates a bottom surface of the mounting post a205*a*.

Further, a left end of the lower arm frame 220 is provided with two gear carrier mounting holes b203*b* symmetrically arranged in the length direction of the mechanical arm all and penetrating the upper and lower surfaces of the lower arm frame 220, and the two gear carrier mounting holes b203*b* are both located to right of a driving roller mounting hole b202*b* provided at the left end of the lower arm frame 220.

Further, among the two gear carrier mounting holes b203*b*, a left gear frame mounting hole b203*b* is aligned with a leftmost gear carrier mounting hole a203*a*, and the right gear frame mounting hole b203*b* is aligned with a middle gear carrier mounting hole a203*a*.

Further, among the two gear carrier mounting holes b203*b*, four mounting posts b205*b* distributed in a rectangular array are arranged to right of the right gear frame mounting hole b203*b*, and bottom surfaces of the mounting posts b205*b* are fixedly connected with the top surface of the lower arm frame 220. Four threaded holes distributed in a rectangular array and penetrating the bottom surface of the lower arm frame 220 are arranged on the right of the right gear frame mounting hole b203*b*, and the threaded holes also penetrate the top surfaces of the mounting posts b205*b*.

Additionally, the plate body of the lower arm frame 220 is also provided with a reserved hole 206 for threading electric wires, so that external electric wires may pass through the reserved hole 206 to connect with the driving assembly 250.

Further, a bottom wall of a middle section of the lower arm frame 220 is provided with a slider a221 and a slider b222 which are symmetrically arranged in the length direction of the mechanical arm all. The slider a221 is provided with a threaded hole penetrating two side walls of the slider a221 in the width direction of the mechanical arm all, where the threaded hole is screwed with the bidirectional screw rod 004. The slider b222 is provided with a through hole penetrating two side walls of the slider b222 in the width direction of the mechanical arm all, where the through hole is slidably sleeved on a rod body of the sliding rod 003. The lower arm frame 220 is driven to slide back and forth along the rod body of the sliding rod 003 through the forward and reverse rotation of the bidirectional screw rod 004.

Figure 12:
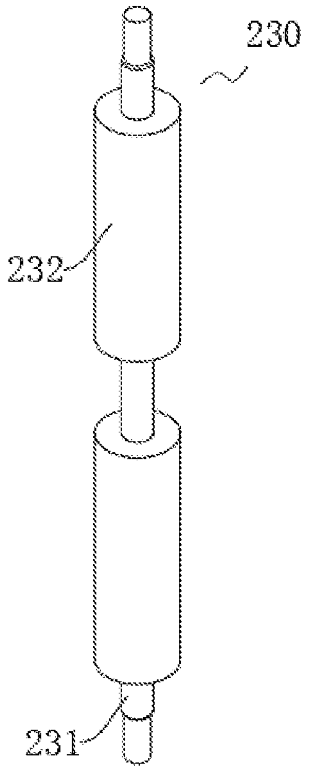
FIG. 12 is a schematic structural diagram of a limit roller according to the disclosure.

With Reference to FIG. 12, one of the limit rollers 230 provided by the disclosure includes a cylindrical roller shaft a231. A top end of the roller shaft a 231 is inserted into a cavity of one of the limit roller mounting holes a201*a* and may rotate in the cavity of the one of the limit roller mounting holes a201*a*; a bottom end of the roller shaft a231 is inserted into a cavity of one of the limit roller mounting holes b201*b* and may rotate in the cavity of the one of the limit roller mounting holes b201*b*.

Additionally, two roller bodies a232 symmetrically arranged up and down are fixedly arranged on a shaft body of the roller shaft a231, and the roller bodies a232 and the roller shaft a231 are coaxially arranged, and roller surfaces of the roller bodies a232 are in rolling contact with a side wall of a cavity of the closed loop of the conveyor belt 100, so as to prevent the conveyor belt 100 from sinking into a clamping cavity formed by the upper arm frame 210 and the lower arm frame 220.

Figure 13:
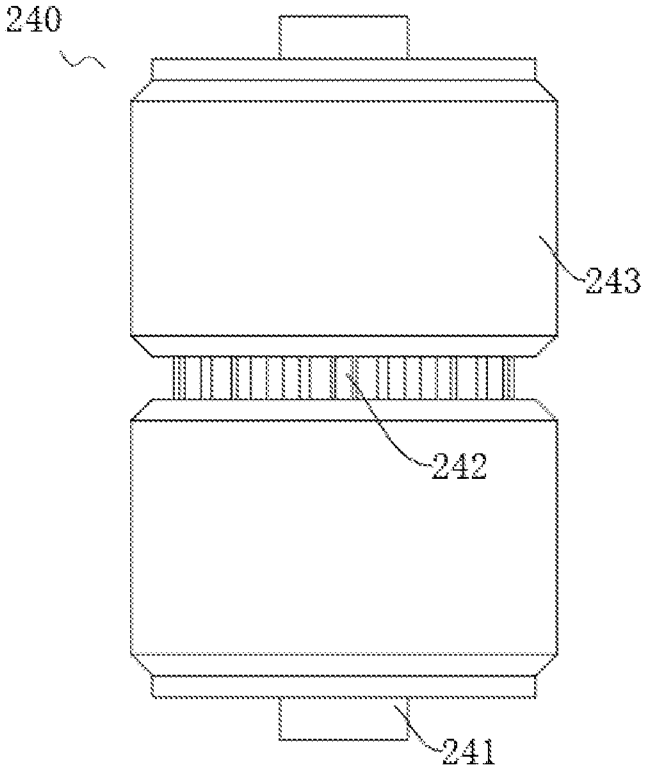
FIG. 13 is a schematic structural view of a driving roller according to the disclosure.
Figure 14:
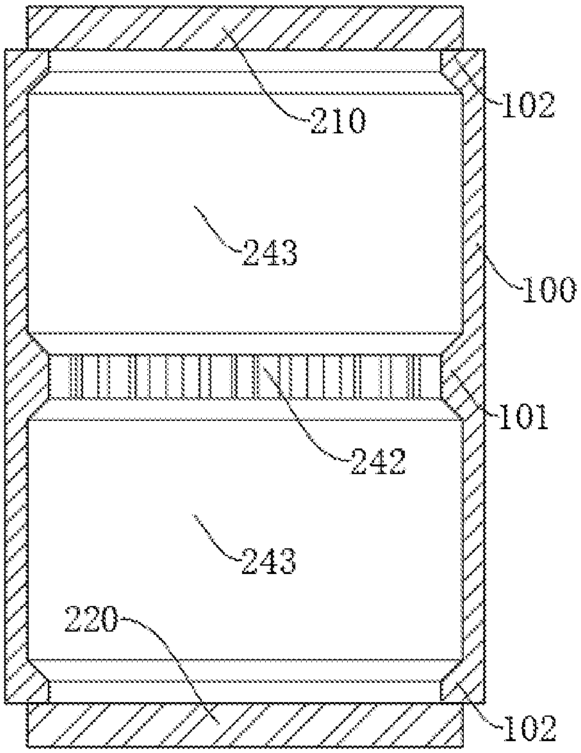
FIG. 14 is a schematic diagram of a connection between a driving roller and a conveyor belt according to the disclosure.

With Reference to FIG. 13 and FIG. 14, one of the driving rollers 240 provided by the disclosure includes a cylindrical roller shaft b241, where an upper end and a lower end of the roller shaft b241 are respectively provided with a bearing 006. A bearing 006 installed at the upper end of the roller shaft b241 is installed in a cavity of one of the driving roller mounting holes a202*a*, so that the upper end of the roller shaft b241 may rotate in the cavity of the one of the driving roller mounting holes a202*a*; a bearing 006 installed at the lower end of the roller shaft b241 is installed in a cavity of one of the driving roller mounting holes b202*b*, so that the lower end of the roller shaft b241 may rotate in the cavity of the one of the driving roller mounting holes b202*b*.

Additionally, a gear a242 is fixedly installed in a middle section of the shaft body of the roller shaft b241, and two roller bodies b243 symmetrically arranged up and down are also fixedly installed on the shaft body of the roller shaft b241. The gear a242 is sandwiched between the two roller bodies b243, and the roller shaft b241, the gear a242 and the roller bodies b243 are coaxially arranged, and roller surfaces of the roller bodies b243 are in a driving contact with side walls of a cavity of the closed loop of the conveyor belt 100 for obtaining the conveyor belt 100 for a conveying movement.

Figure 15:
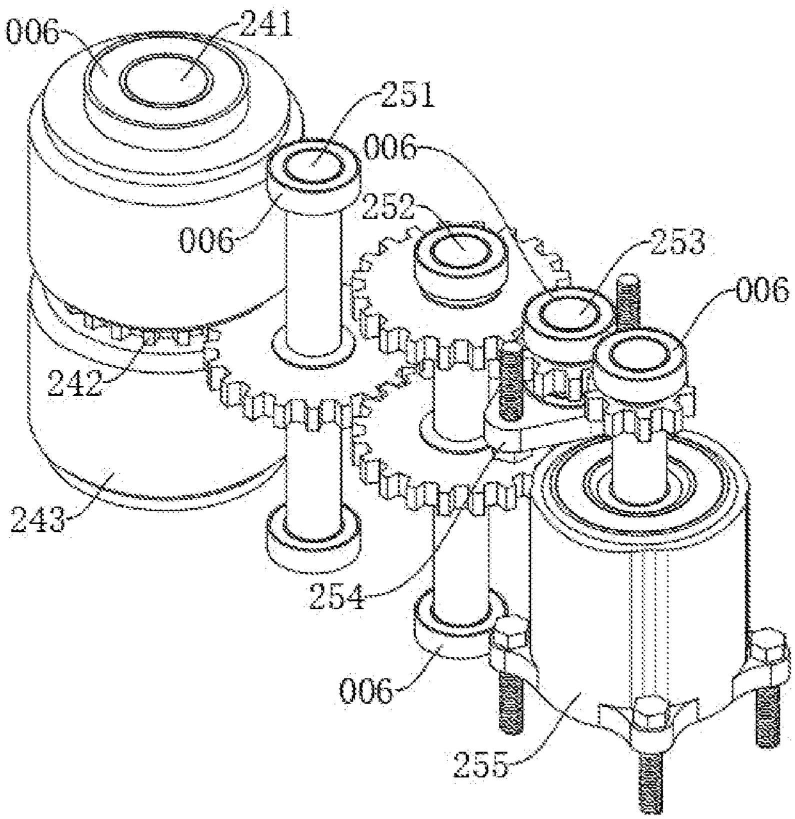
FIG. 15 is a schematic diagram of a connection between driving rollers and driving assembly according to the disclosure.

With Reference to FIG. 15, the driving assembly 250 provided by the disclosure includes a gear carrier a251, a gear carrier b252, a gear carrier c253, a mounting pad 254 and a motor b255.

Further, the gear carrier a251 includes a cylindrical first rod body and a first gear fixedly installed in a middle section of the first rod body. The first rod body in the gear carrier a251 and the first gear installed on the first rod body are coaxially arranged, and the first gear in the gear carrier a251 meshes with the gear a242.

Additionally, an upper end and a lower end of the rod body in the gear carrier a251 are respectively provided with a bearing 006. A bearing 006 installed at the upper end of the first rod body in the gear carrier a251 is mounted in a cavity of the leftmost gear carrier mounting hole a203*a*, so that the upper end of the first rod body in the gear carrier a251 may rotate in the cavity of the gear carrier mounting hole a203*a*. A bearing 006 installed at the lower end of the first rod body in the gear carrier a251 is installed in the cavity of the left gear frame mounting hole b203*b*, so that the lower end of the first rod body in the gear carrier a251 may rotate in a cavity of the gear carrier mounting hole b203*b*.

Further, the gear carrier b252 includes a cylindrical second rod body and a second middle gear and a second upper gear fixedly installed at a middle section and an upper section of the second rod body respectively. The second rod body in the gear carrier b252 and the second middle gear and the second upper gear installed on the second rod body are coaxially arranged, and the second middle gear installed at the middle section of the second rod body in the gear carrier b252 meshes with the first gear in the gear carrier a251.

Additionally, an upper end and a lower end of the rod body in the gear carrier b252 are respectively provided with a bearing 006. A bearing 006 installed at the upper end of the second rod body in the gear carrier b252 is installed in a cavity of the middle gear carrier mounting hole a203*a*, so that the upper end of the second rod body in the gear carrier b252 may rotate in the cavity of the gear carrier mounting hole a203*a*. A bearing 006 installed at the lower end of the second rod body in the gear carrier b252 is installed in a cavity of the right gear frame mounting hole b203*b*, so that the lower end of the rod body in the gear carrier b252 may rotate in the cavity of the gear carrier mounting hole b203*b*.

Further, the gear carrier c253 includes a cylindrical third rod body and a third gear fixedly installed in a middle section of the third rod body. The third rod body in the gear carrier c253 and the third gear installed on the third rod body are arranged coaxially, and the third gear in the gear carrier c253 meshes with the second upper gear installed on the upper section of the second rod body in the gear carrier b252.

Additionally, an upper end and a lower end of the third rod body in the gear carrier c253 are respectively provided with a bearing 006. A bearing 006 installed at the upper end of the third rod body in the gear carrier c253 is installed in a cavity of the rightmost gear carrier mounting hole a203*a*, so that the upper end of the third rod body in the gear carrier c253 may rotate in the cavity of the gear carrier mounting hole a203*a*.

Further, the mounting pad 254 is an oval plate body arranged horizontally, and a middle section of the mounting pad 254 is provided with an axial hole, and a bearing 006 installed at the lower end of the third rod body in the gear carrier c253 is installed in a cavity of the axial hole, so that the lower end of the third rod body in the gear carrier c253 may rotate in the cavity of the axial hole.

Additionally, a top surface of the mounting pad 254 abuts against the bottom surface of the mounting post a205*a*, and a front end and a rear end of the mounting pad 254 are respectively provided with a first mounting hole, where each first mounting hole is aligned with the threaded hole of the mounting post a205*a* and is fixedly connected by bolts.

Further, the motor b255 includes a motor for driving and a gear fixedly installed at an output end of the motor (an external end of a rotor of the motor b255). The rotor of the motor b255 and the gear installed on the rotor are coaxially arranged, and the gear installed on the rotor of the motor b255 meshes with the third gear in the gear carrier c253.

Additionally, an upper end of the rotor in the motor b255 is installed with a bearing 006, where the bearing 006 is installed in the cavity of the motor shaft mounting hole 204, so that the upper end of the rotor in the motor b255 may rotate in a cavity of the motor shaft mounting hole 204.

Additionally, a bottom of the motor b255 is placed on top walls of the mounting posts b205*b*, and the bottom of the motor b255 is provided with second mounting holes distributed in a rectangular array, where the second mounting holes are aligned with the threaded holes of the mounting posts b205*b* and fixedly connected by bolts.

In the disclosure, in addition to the above contents, it is also worth noting that the structures of the mechanical arm all are basically the same as structures of the mechanical arm b12, and the mechanical arm all and the mechanical arm b12 are symmetrically arranged in the width direction of the mechanical arm all, and the limit rollers 230 in the mechanical arm all and limit rollers 230 in the mechanical arm b12 are located at a front side and a rear side of a clamping cavity formed by the mechanical arm all and the mechanical arm b12, respectively. The structures of the mechanical arm all differ from the structures of the mechanical arm b12 in following two points.

Firstly, there is no driving assembly 250 in the structures of the mechanical arm b12, and the mechanical arm b12 is used to assist the mechanical arm all to operate together, so as to clamp and transfer the parts. The driving assembly 250 in the mechanical arm all is used to drive the conveyor belt 100 in the mechanical arm all for a driving operation. Under a clamping state of the conveyor belt 100 in the mechanical arm all and a conveyor belt 100 in the mechanical arm b12, the conveyor belt 100 in the mechanical arm b12 moves synchronously with the conveyor belt 100 in the mechanical arm all, so as to achieve a purpose of carrying the parts in a straight line.

Secondly, a thread direction of the threaded hole opened on the slider a221 in the mechanical arm all is opposite to a thread direction of a threaded hole opened on a slider a221 in the mechanical arm b12, and the two sliders a221 are respectively screwed on rod bodies with different thread directions of the bidirectional screw rod 004, so that the mechanical arm all and the mechanical arm b12 may move towards each other or away from each other at the same time under the rotation of the bidirectional screw rod 004.

In the above contents, exemplary implementations of schemes proposed in this disclosure have been described in detail with reference to the preferred embodiments. However, those skilled in the art may understand that various variations and modifications may be made to the above specific embodiments without departing from a concept of this disclosure, and various technical features and structures proposed in this disclosure may be combined in various ways without exceeding the protection scope of this disclosure. The protection scope of this disclosure is determined by appended claims.

What is claimed is:

1. A conveying manipulator for machining precision parts, comprising two machining tables with tabletops on a same horizontal plane for placing parts to be machined, a mechanical arm assembly for conveying the parts, and a mounting bracket for mounting the mechanical arm assembly, wherein the mechanical arm assembly comprises a mechanical arm a for conveying the parts and a mechanical arm b for assisting the mechanical arm a to jointly convey the parts, and the mechanical arm a comprises a conveyor belt and an arm frame assembly;

the conveyor belt is used for clamping and conveying the parts, and the arm frame assembly comprises an upper arm frame and a lower arm frame for mounting, limit rollers for limiting position of the conveyor belt, driving rollers for driving the conveyor belt, and a driving assembly for driving the driving rollers; and the mechanical arm b has same structures as structures of the mechanical arm a except for an absence of same assembly as the driving assembly in the structures of the mechanical arm b, and the mechanical arm a and the mechanical arm b are symmetrically arranged in a clamping cavity of two vertical plates in a width direction of the mechanical arm a;

wherein the mounting bracket comprises a horizontally placed square plate; a bottom surface of the square plate is fixedly provided with electrically driven track wheels, wherein bottoms of the track wheels are provided with guide rails; a top surface of the square plate is fixedly provided with the two vertical plates symmetrically arranged in the width direction of the mechanical arm a, wherein a sliding rod and a bidirectional screw rod parallel to a length direction of the mechanical arm a are installed between the two vertical plates; and a motor a for driving the bidirectional screw rod is fixedly installed on the top surface of the square plate;

ends of the conveyor belt are connected to form a closed loop, and a belt surface of the conveyor belt is perpendicular to the top surface of the square plate, and side walls of a cavity of the closed loop in a middle section of the conveyor belt are provided with reinforcing ribs a, and side walls of a cavity of the closed loop at an upper end and a lower end of the conveyor belt are provided with reinforcing ribs b; and an upper arm frame is a strip plate; a side of the upper arm frame is uniformly provided with limit roller mounting holes a penetrating upper and lower surfaces of the upper arm frame, and an end of the upper arm frame is provided with gear carrier mounting holes a and a motor shaft mounting hole, ends of the upper arm frame are provided with driving roller mounting holes a, the gear carrier mounting holes a, the motor shaft mounting hole, and the driving roller mounting holes a are all penetrating the upper and lower surfaces of the upper arm frame, and a bottom wall of the end of the upper arm frame is provided with mounting posts a.

2. The conveying manipulator for machining the precision parts according to claim 1, wherein both ends of each of the sliding rod and the bidirectional screw rod are respectively installed on plate bodies of the two vertical plates through bearing seats, and an output end of the motor a is connected with an end of the bidirectional screw rod close to the motor through a coupling.

3. The conveying manipulator for machining the precision parts according to claim 1, wherein the lower arm frame is a strip plate; a side of the lower arm frame is uniformly provided with limit roller mounting holes b penetrating upper and lower surfaces of the lower arm frame, an end of the lower arm frame is provided with gear carrier mounting holes b, ends of the lower arm frame are provided with driving roller mounting holes b, the gear carrier mounting holes b and the driving roller mounting holes b are penetrating the upper and lower surfaces of the lower arm frame, a bottom wall of the end of the lower arm frame is also provided with mounting posts b, the lower arm frame is also provided with a reserved hole for threading electric wires, and a bottom wall of a middle section of the lower arm frame is provided with a slider a and a slider b arranged symmetrically; the slider a is provided with a threaded hole penetrating two side walls of the slider a in the width direction of the mechanical arm a, wherein the threaded hole is screwed with the bidirectional screw rod; and the slider b is provided with a through hole penetrating two side walls of the slider b in the width direction of the mechanical arm a, wherein the through hole is sliding sleeved on the sliding rod.

4. The conveying manipulator for machining the precision parts according to claim 3, wherein each of limit rollers comprises a cylindrical roller shaft a; two roller bodies a symmetrically arranged up and down are fixedly arranged on the roller shaft a, and the roller bodies a and the roller shaft a are coaxially arranged; and a top end of the roller shaft a is inserted into a cavity of one of the limit roller mounting holes a, and a bottom end of the roller shaft a is inserted into a cavity of one of the limit roller mounting holes b.

5. The conveying manipulator for machining the precision parts according to claim 3, wherein each of the driving rollers comprises a cylindrical roller shaft b, a top end of the roller shaft b is arranged in a cavity of one of driving roller mounting holes a, and a bottom end of the roller shaft b is arranged in a cavity of one of driving roller mounting holes b; a gear a is fixedly installed in a middle section of a shaft body of the roller shaft b, two roller bodies b symmetrically arranged up and down are also fixedly installed on the shaft body of the roller shaft b, and the gear a is sandwiched between two the roller bodies b, and the roller shaft b, the gear a and the roller bodies b are coaxially arranged.

6. The conveying manipulator for machining the precision parts according to claim 5, wherein the driving assembly comprises a gear carrier a, a gear carrier b, a gear carrier c, a mounting pad and a motor b;

the gear carrier a comprises a cylindrical first rod body and a first gear fixedly installed in a middle section of the first rod body, wherein the first rod body of the gear carrier a and the first gear are coaxially arranged, and the first gear is meshed with the gear a; and a top end of the first rod body of the gear carrier a is arranged in a cavity of one of gear carrier mounting holes a, and a bottom end of the first rod body in the gear carrier a is arranged in a cavity of one of gear carrier mounting holes b;

the gear carrier b comprises a cylindrical second rod body, and a second middle gear and a second upper gear fixedly installed at a middle section and an upper section of the second rod body respectively, wherein the second rod body of the gear carrier b and the second middle gear and the second upper gear are coaxially arranged, and the second middle gear installed at the middle section of the second rod body in the gear carrier b is meshed with the first gear in the gear carrier a; and a top end of the second rod body in the gear carrier b is arranged in a cavity of one of the gear carrier mounting holes a, and a bottom end of the second rod body in the gear carrier b is arranged in a cavity of one of the gear carrier mounting holes b;

the gear carrier c comprises a cylindrical third rod body and a third gear fixedly installed in a middle section of the third rod body, wherein the third rod body and the third gear in the gear carrier c are coaxially arranged, and the third gear in the gear carrier c is meshed with the second upper gear installed on the upper section of the second rod body in the gear carrier b, and a top end of the third rod body in the gear carrier c is arranged in a cavity of one of the gear carrier mounting holes a;

the mounting pad is an oval plate body arranged horizontally, wherein a middle section of the mounting pad is provided with a shaft hole for mounting the gear carrier c, and a bottom end of the third rod body in the gear carrier c is arranged in the shaft hole, and both ends of the mounting pad are provided with first mounting holes for fixing the mounting pad, and each of the first mounting holes is aligned with corresponding one of the mounting posts a respectively; and the motor b comprises a motor for driving and a gear fixedly installed at an end of a rotor of the motor, wherein the rotor in the motor b and the gear installed at the end of the rotor are coaxially arranged, and the gear is meshed with the third gear in the gear carrier c; and a top end of the end of the rotor in the motor b is arranged in a cavity of the motor shaft mounting hole, and a bottom of the motor b is provided with second mounting holes for fixing the motor b, wherein each of the second mounting holes is aligned with corresponding one of the mounting posts b respectively.

* * * * *